US010623326B2

(12) United States Patent
Thubert et al.

(10) Patent No.: US 10,623,326 B2
(45) Date of Patent: Apr. 14, 2020

(54) JITTER COMPENSATION ALONG MULTIPLE-PATH DETERMINISTIC NETWORK SEGMENT

(71) Applicant: Cisco Technology, Inc., San Jose, CA (US)

(72) Inventors: Pascal Thubert, La Colle sur Loup (FR); Patrick Wetterwald, Mouans Sartoux (FR); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 75 days.

(21) Appl. No.: 15/914,238

(22) Filed: Mar. 7, 2018

(65) Prior Publication Data

US 2019/0280983 A1 Sep. 12, 2019

(51) Int. Cl.
*H04L 12/841* (2013.01)
*H04L 12/851* (2013.01)
*H04L 12/835* (2013.01)
*H04L 12/26* (2006.01)

(52) U.S. Cl.
CPC .......... *H04L 47/283* (2013.01); *H04L 43/087* (2013.01); *H04L 47/2483* (2013.01); *H04L 47/30* (2013.01)

(58) Field of Classification Search
CPC ... H04L 47/283; H04L 47/2483; H04L 47/30; H04L 43/087
See application file for complete search history.

(56) References Cited

U.S. PATENT DOCUMENTS

| 9,602,420 | B2 | 3/2017 | Thubert et al. |
|---|---|---|---|
| 2015/0089081 | A1 | 3/2015 | Thubert et al. |
| 2016/0021017 | A1 | 1/2016 | Thubert et al. |
| 2016/0150256 | A1 | 5/2016 | Van Zijst |
| 2016/0248886 | A1 | 8/2016 | Thubert et al. |
| 2016/0269188 | A1 | 9/2016 | Thubert et al. |
| 2016/0308793 | A1 | 10/2016 | Levy-Abegnoli et al. |

(Continued)

OTHER PUBLICATIONS

Finn, et al, "Deterministic Network Architecture", IETF, Internet Draft, Oct. 30, 2017, 41 pages (Year: 2017).*

(Continued)

*Primary Examiner* — Kent Krueger
(74) *Attorney, Agent, or Firm* — Leon R. Turkevich

(57) ABSTRACT

In one embodiment, a method comprises identifying, by a controller device, first and second paths between an ingress network node and an egress network node in a deterministic network for an identified flow of data packets in an identified sequence, the identifying including identifying a replication node for replicating the identified flow into the first and second paths, and identifying an elimination node for receiving transmitted data packets along the first and second paths for the identified flow and transmitting the identified flow of data packets in the identified sequence; determining a jitter difference of the identified flow between the first and second paths, the jitter difference identifying a maximum jitter encountered in an average difference of latency between the first and second paths; and causing at least one of the elimination node or an upstream node along one of the first or second paths to absorb the jitter difference.

20 Claims, 5 Drawing Sheets

(56) References Cited

U.S. PATENT DOCUMENTS

2017/0201451 A1     7/2017   Allan
2017/0366445 A1*   12/2017   Nemirovsky ........... H04L 45/12

OTHER PUBLICATIONS

Santos et al., "Enhanced Differential Delay Compensation in OTN with Dedicated and Shared Buffering Architectures", [online], ECOC Technical Digest 2011 OSA, [retrieved on Nov. 28, 2017]. Retrieved from the Internet: URL: <http://ieeexplore.ieee.org/document/6066207/>, 3 pages.

Thubertet al., "IETF 6TSCH: Combining IPv6 Connectivity with Industrial Performance" [online], Jul. 2013, [retrieved on Nov. 9, 2017]. Retrieved from the Internet: <URL: https://www.researchgate.net/profile/Pascal_Thubert/publication/261430569_IETF_6TSCH_Combining_IPv6_Connectivity_with_Industrial_Performance/links/56c4887c08ae7fd4625a28c8/IETF-6TSCH-Combining-IPv6-Connectivity-with-Industrial-Performance.pdf?origin=publication_detail>, pp. 1-7.

Geng et al., "IGP-TE Extensions for DetNet Information Distribution", [online], Interdomain Routing Working Group, Internet Draft, Sep. 20, 2017, [retrieved on Feb. 21, 2018]. Retrieved from the Internet: URL: <https://tools.ietf.org/pdf/draft-geng-detnet-info-distribution-01.pdf>, pp. 1-12.

Finn et al., "Deterministic Networking Problem Statement", [online], Detnet Working Group, Internet Draft, Sep. 16, 2017, [retrieved on Feb. 21, 2018]. Retrieved from the Internet: https://tools.ietf.org/pdf/draft-ietf-detnet-problem-statement-02.pdf>, pp. 1-11.

Grossman, Ed., et al., "Deterministic Networking Use Cases", [online], Internet Engineering Task Force, Internet Draft, Sep. 18, 2017, [retrieved on Feb. 21, 2018]. Retrieved from the Internet: URL: <https://tools.ietf.org/pdf/draft-ietf-detnet-use-cases-13.pdf>, pp. 1-91.

Filsfils, Ed., et al., "Segment Routing Architecture", [online], Network Working Group, Internet Draft, Dec. 20, 2017, [retrieved on Feb. 22, 2018]. Retrieved from the Internet: URL: <https://tools.ietf.org/pdf/draft-ietf-spring-segment-routing-14.pdf>, pp. 1-31.

Hruska, "What is Jitter?", [online], Speedtest Blog, Apr. 13, 2015, [retrieved on Jan. 19, 2017]. Retrieved from the Internet: URL: <http://www.speedtest.net/articles/what-is-jitter/>, pp. 1-3.

Li et al., "On the Performance of STAR: an Efficient Delay-Bound, Low-Cost Multicast Algorithm", Proceedings of the 35th Annual Simulation Symposium (SS'02), 2002 IEEE, 9 pages.

Thubert et al., U.S. Appl. No. 15/423,741, filed Feb. 3, 2017.
Thubert et al., U.S. Appl. No. 15/713,827, filed Sep. 25, 2017.
Wetterwald et al., U.S. Appl. No. 15/813,289, filed Nov. 15, 2017.
Thubert et al., U.S. Appl. No. 15/725,502, filed Oct. 5, 2017.
Thubert et al., U.S. Appl. No. 15/787,790, filed Oct. 19, 2017.

* cited by examiner

JITTER COMPENSATION ALONG MULTIPLE-PATH DETERMINISTIC NETWORK SEGMENT

TECHNICAL FIELD

The present disclosure generally relates to jitter compensation along a multiple-path deterministic network segment.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) Deterministic Networking (DetNet) Working Group is addressing proposals for satisfying the stringent requirements of deterministic networks (e.g., minimal jitter (i.e., packet delay variation), low latency, minimal packet loss, and high reliability). The DetNet Working Group is investigating proposals for networks that are under a single administrative control or within a closed group of administrative control, where such networks within the single/closed group of administrative control can provide forwarding along a multi-hop path with the deterministic properties of controlled latency, low packet low, low packet delay variation, and high reliability. As an example of a deterministic network, consider a railway system: a railway system can be seen as deterministic because trains are scheduled to leave a railway station at certain times, to traverse any number stations along a track at very precise times, and to arrive at a destination station at an expected time.

Deterministic transmission in wired networks can use time sensitive networking (TSN) and/or audio/video bridging (AVB) for deterministic networks such as professional and home audio/video, multimedia in transportation, vehicle engine control systems, and/or other general industrial and/or vehicular applications. Neither TSN nor AVB use time slots; rather, TSN uses time-based shapers that allocate time slices and guard bands to cause a data packet to be sent or received at a given intermediate node (i.e., hop) along a path at a prescribed precise time that is reserved exclusively for the given hop; AVB can use credit-based shapers that ensure bounded latency transmit/receive queues in each hop without congestion, thereby ensuring a bounded latency.

Bicasting can be employed in industrial wireless applications where both reliability and timeliness of data traffic must be guaranteed. However, existing bicasting solutions do not address that different available routes can have substantially different source-to-destination transmission times that can result in a substantially large difference in latency between the available routes.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
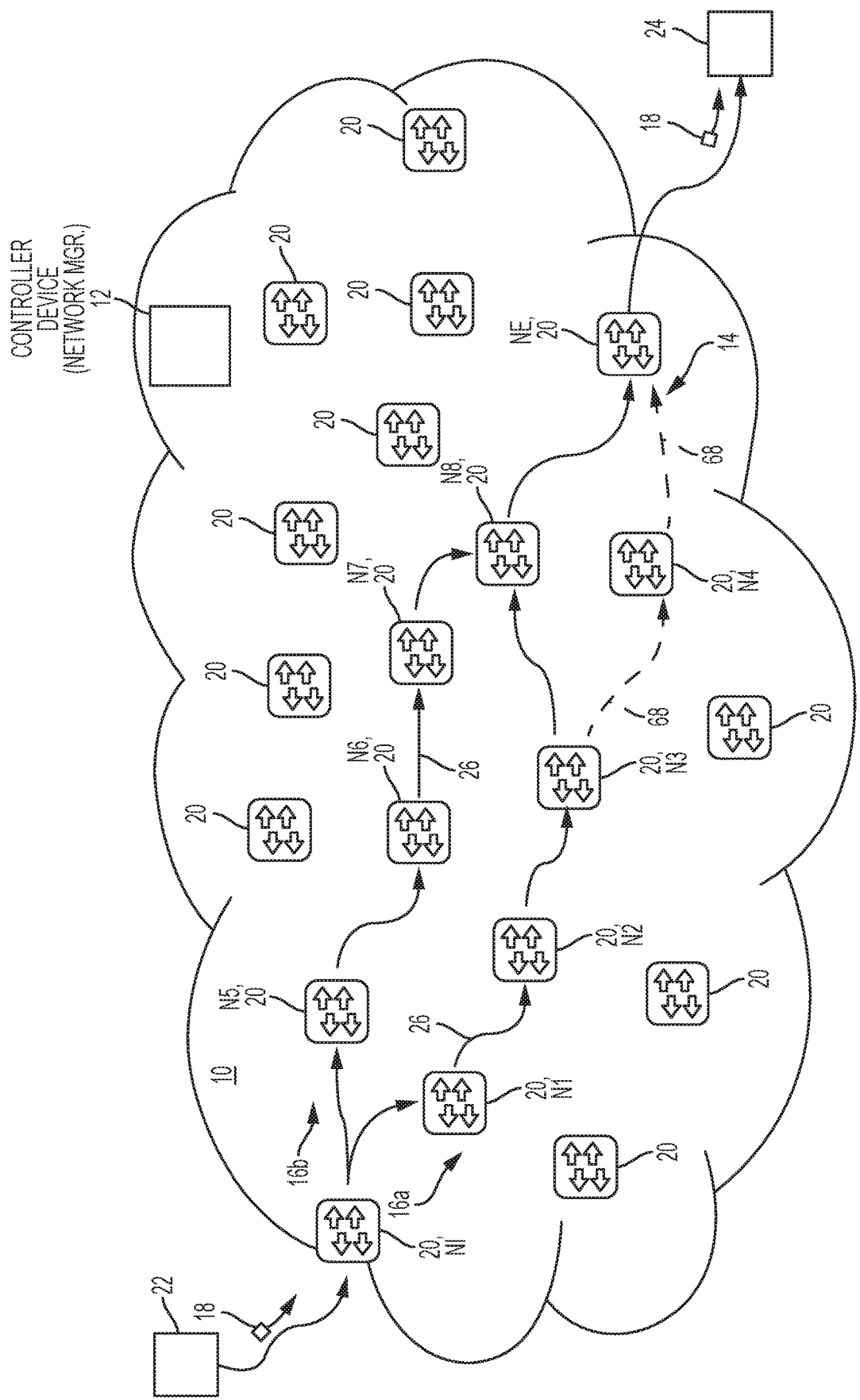
FIG. 1 illustrates an example deterministic data network having an apparatus for causing absorption, by an elimination node or an upstream node thereof, of a jitter difference between first and second paths of a deterministic segment between a replication node and the elimination node, according to an example embodiment.

In one embodiment, a method comprises: identifying, by a controller device, first and second paths between an ingress network node and an egress network node in a deterministic network for an identified flow of data packets in an identified sequence, the identifying including identifying a replication node for replicating the identified flow into the first and second paths, and identifying an elimination node for receiving transmitted data packets along the first and second paths for the identified flow and transmitting the identified flow of data packets in the identified sequence; determining, by the controller device, a jitter difference of the identified flow between the first and second paths, the jitter difference identifying a maximum jitter encountered in an average difference of latency between the first and second paths; and causing, by the controller device, at least one of the elimination node or an upstream node along one of the first or second paths to absorb the jitter difference.

In another embodiment, an apparatus comprises a memory circuit configured for storing executable instructions, and a processor circuit configured for executing the executable instructions. The processor circuit, in response to execution of the executable instructions, is configured for: identifying first and second paths between an ingress network node and an egress network node in a deterministic network for an identified flow of data packets in an identified sequence, the identifying including identifying a replication node for replicating the identified flow into the first and second paths, and identifying an elimination node for receiving transmitted data packets along the first and second paths for the identified flow and transmitting the identified flow of data packets in the identified sequence; determining a jitter difference of the identified flow between the first and second paths, the jitter difference identifying a maximum jitter encountered in an average difference of latency between the first and second paths, and causing at least one of the elimination node or an upstream node along one of the first or second paths to absorb the jitter difference.

In another embodiment, one or more non-transitory tangible media are encoded with logic for execution by a machine and when executed by the machine operable for: identifying, by the machine implemented as a controller device, first and second paths between an ingress network node and an egress network node in a deterministic network for an identified flow of data packets in an identified sequence, the identifying including identifying a replication node for replicating the identified flow into the first and second paths, and identifying an elimination node for receiving transmitted data packets along the first and second paths for the identified flow and transmitting the identified flow of data packets in the identified sequence; determining, by the controller device, a jitter difference of the identified flow between the first and second paths, the jitter difference identifying a maximum jitter encountered in an average difference of latency between the first and second paths; and causing, by the controller device, at least one of the elimination node or an upstream node along one of the first or second paths to absorb the jitter difference.

DETAILED DESCRIPTION

Particular embodiments enable a controller device to establish, within a deterministic network, a deterministic network segment comprising multiple paths between an ingress network node and an egress network node of the deterministic segment for deterministic transmission of an identified flow of data packets in an identified sequence: the controller device can cause any jitter between the multiple paths to be absorbed at or near the egress network node based on memory capabilities of the egress network node relative to upstream nodes along the multiple paths.

FIG. 1 is a diagram illustrating an example deterministic data network 10 having a controller device 12 configured for establishing a deterministic segment 14 comprising plural deterministic paths (e.g., 16a, 16b) for deterministic transport of an identified flow of data packets 18 via selected network devices (i.e., network nodes) 20, according to an example embodiment. The controller device 12, implemented for example as a centralized network controller such as a path computation element (PCE), a TSN centralized network manager, an AVB scheduler, network manager, etc., can be configured for establishing the deterministic network segment 14 for deterministic transport of the identified flow of data packets 18, received from a source host device 22 (e.g., a data source such as a video or sensor source, industrial controller), toward a destination host device 24 (e.g., an industrial machine responsive to the identified flow of data packets 18). Although not shown in FIG. 1, any one of the source host device 22 and/or the destination host device 24 can be either directly connected to the deterministic data network 10 or reachable via another local area network (LAN), another deterministic data network having a different distinct management domain, and/or wide area network (WAN) (e.g., the Internet).

Any one or more of the network devices 20 can be implemented, for example, as a wired or wireless network device configured for providing deterministic transmission according to any one of available deterministic protocols, for example TSN, AVB, DetNet, and/or 6TiSCH. For example, any one or more of the network devices 20 can be implemented as a switching device implemented for example as a commercially-available Cisco® Industrial Ethernet (IE) 4000 Series and/or IE 5000 Series Switch from Cisco Systems, San Jose, Calif.; any one network device 20 also can be implemented as a low-power device in a low power and lossy network (LLN), for example based on utilizing a routing protocol that provides IPv6 routing using time slotted channel hopping (TSCH) based on IEEE 802.15.4e ("6TiSCH"), enabling wireless LLN devices to use low-power operation and channel hopping for higher reliability.

A deterministic data network (e.g., 10) can require strict timing synchronization and scheduling along each hop from a source host device to a destination host. A network manager (e.g., a TSN controller, scheduler, etc.) within the deterministic data network can have a prescribed management domain (i.e., deterministic domain) for controlling each network device along the deterministic path, starting with the source host device 22 transmitting the identified flow of data packets 18 into the deterministic data network 10, continuing with each network device (e.g., a deterministic switching device) 20 along a deterministic path 16, and ending with the egress device "NE" 20 at the end of the deterministic path. Hence, the network controller 12 can establish, for each deterministic data link along a deterministic path, a scheduled transmit time, a scheduled receive time, and a common time reference used for synchronization of each of the deterministic network devices in the deterministic domain. Deterministic networks can be used for industrial automation, vehicle control systems, and other systems that require precise delivery of control commands to a controlled device. However, implementing deterministic networking can include stringent deterministic constraints such as packet delivery within a prescribed latency, zero or near-zero jitter, high packet delivery ratios, etc.

An alternative to deployment of TSN, AVB, or DetNet in the deterministic data network 10 can include "6TiSCH", as appropriate: in particular, assuming the network devices 20 are implemented as low power and lossy network (LLN) devices, the network devices 20 can utilize a routing protocol that provides IPv6 routing using time slotted channel hopping (TSCH) based on IEEE 802.15.4e ("6TiSCH"), enabling wireless LLN devices to use low-power operation and channel hopping for higher reliability.

Hence, the controller device 12 can establish the deterministic network segment 14 in a prescribed deterministic data network (e.g., DetNet, TSN, AVB, 6TiSCH, etc.) 10 based on establishing, for example, a fixed bandwidth or throughput for reliable delivery of data packets at a precise reception time; the controller device 12 also can establish that a network device 20 receives a data packet at a precisely-scheduled receive time, as appropriate (e.g., in a TSN network). Hence, the controller device 12 can establish stringent deterministic constraints based on defining a transmission schedule relative to: (1) a period of time "T"; (2) a maximum packet size "F"; and a maximum number of data packets "N" that can be transmitted on a deterministic link within the period of time "T". Hence, the controller device 12 can cause a deterministic network device 20 to transmit on a deterministic link 26, at a scheduled transmission time within the period of time "T", a maximum number of "N" data packets having a maximum size "F"; in other words, a data packet exceeding size "F" could be dropped by a receiving network device 20 if transmitted on the deterministic link; further, if "N+1" packets are transmitted on the deterministic data link 26 at the scheduled transmission time within the period of time "T", the first "N" packets could be accepted by the receiving network device 20, and the "N+1" packet could be dropped.

Deployment of a deterministic network can become substantially difficult and complex in high-speed networks such as AVB or TSN over gigabit Ethernet. Random variations and fluctuations within a deterministic network still can result in an occasional loss of a data packet that is traversing a deterministic data network 10.

As illustrated in FIG. 1, the occasional loss of a data packet can be addressed by the controller device 12 allocating within the deterministic data network 10 a deterministic network segment 14 comprising multiple paths 16a, 16b for deterministic transport of the identified flow of data packets 18 across the deterministic data network 10. The controller device 12 can identify for the deterministic network segment 14 a replication node, for example an ingress node "NI" 20 to the deterministic data network 10 that receives the identified flow of data packets 18 from the external source host device 22: the controller device 12 can cause the replication node (e.g., "NI" 20) to replicate the identified flow of data packets 18 for deterministic transmission into a first (e.g., "Left") deterministic path 16a and into a second (e.g., "Right") deterministic path 16b according to deterministic constraints established by the controller device 12. Hence, each deterministic path 16a and 16b is originated by the replication node and terminated by the elimination node.

The controller device 12 also can identify for the deterministic network segment 14 comprising the paths 16a and 16b an elimination node (e.g., the egress network device "NE" 20): the controller device 12 can cause the elimination node (e.g., "NE" 20) to receive transmitted data packets along the first and second paths 16a, 16b for the identified flow of data packets 18, recover any lost packets (e.g., lost from the deterministic path 16a) in response to reception of the associated copies from the deterministic path 16b, eliminate any duplicate copies of the data packets received along the two deterministic paths 16a and 16b, and output the identified flow of data packets 18, in the identified sequence as received by the ingress network device "NI" 20, toward the destination host device 24.

As illustrated in FIG. 1, the controller device 12 can initially establish the deterministic path 16a as the hop-by-hop sequence of network devices "N1", "N2", "N3", "N4" (before the chosen elimination node "NE"); the controller device 12 also can initially establish the deterministic path 16b as the hop-by-hop sequence of network devices "N5", "N6", "N7", and "N8" (before the chosen elimination node "NE"). As described below, the controller device 12 can change the deterministic path 16a to the hop-by-hop sequence of network devices "N1", "N2", "N3", "N8" (terminated by the network device "N8" chosen as the new elimination node) based on determining the egress node "NE" 20 has insufficient resources to serve as an elimination node for the identified flow of data packets 18.

An additional concern is that the selected elimination node that receives the first copy of the identified flow of data packets 18 via the deterministic path 16a, and the second copy of the identified flow of data packets 18 via the deterministic path 16b, has sufficient buffer memory capacity to store transmitted data packets that have been received via the respective deterministic paths 16a and 16b: although only a single identified flow of data packets 18 is shown in FIG. 1 (originating from the source host device 22 for delivery to the destination host device 24), in actual deployments the controller device 12 may need to schedule and manage different identified flows of data packets; hence, the egress network node "NE" 20 could be required to serve as the egress point for numerous different identified flows of data packets (e.g., N flows), requiring a multiple of buffer memory resources (e.g., Mem) for each identified flow, resulting in a total buffer memory requirement of "N*Mem" for all the allocated flows (the symbol "*" as used herein refers to a multiplication operation).

Figure 2:
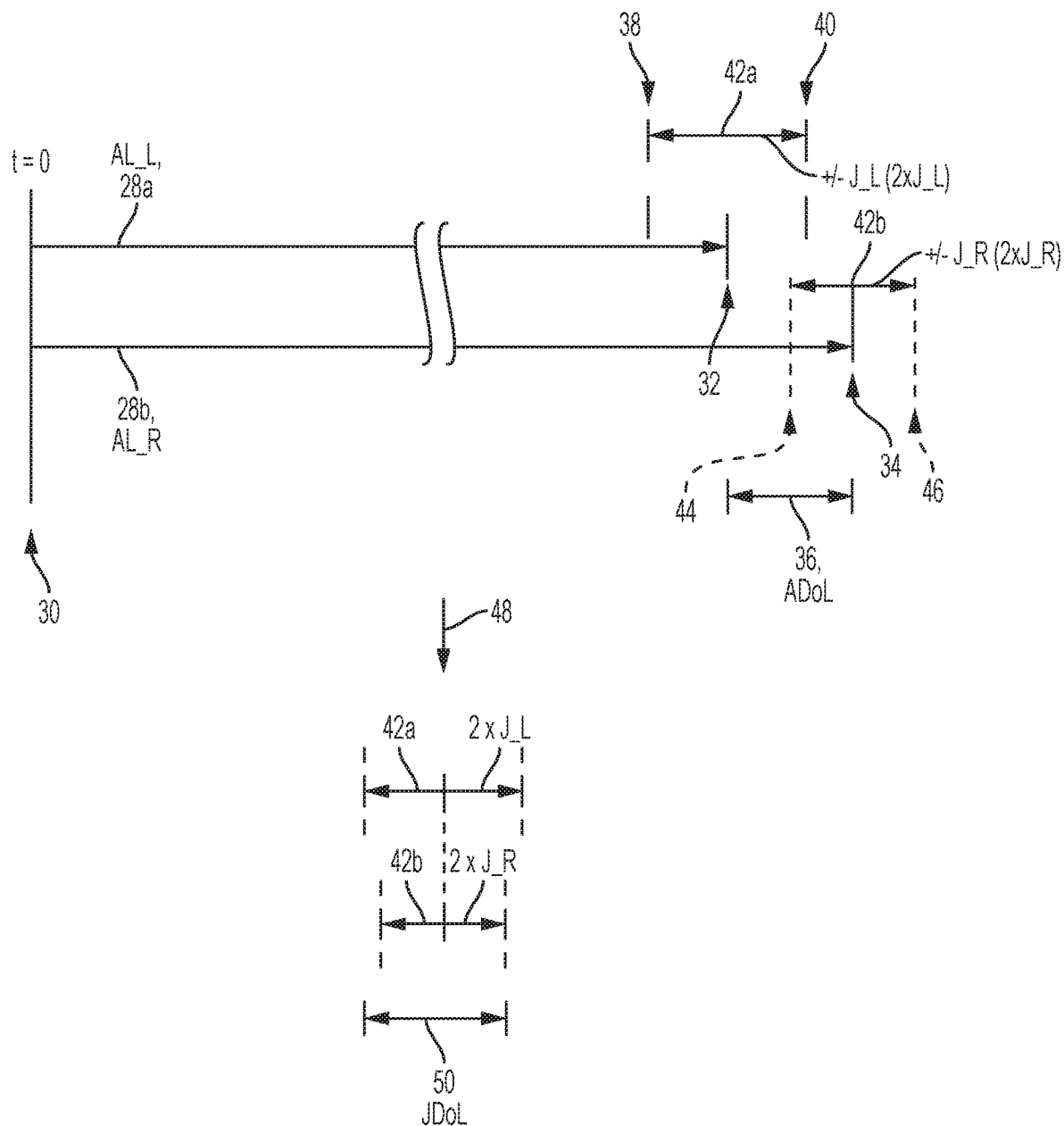
FIG. 2 illustrates a jitter difference between the first and second paths, the jitter difference identifying a maximum jitter encountered in an average difference of latency between the first and second paths, according to an example embodiment.

FIG. 2 illustrates that the buffer memory requirement for a given identified data flow can be substantially affected by not only by differences in average latency 28 between transport via the first deterministic path 16a as opposed to via the second deterministic path 16b, but the buffer memory requirement also can be substantially affected by differences in jitter 50 between the average latencies 28. In particular, FIG. 2 illustrates the average latency "AL_L" 28a, determined over time by the controller device 12, in transmitting a data packet via the deterministic path 16a from a replication node (e.g., "NI" 20) at time "t=0" at event 30 until reaching an identified elimination node (e.g., the egress node "NE" 20) at event 32. FIG. 2 also illustrates the average latency "AL_R" 28b, determined over time by the controller device 12, in transmitting a data packet via the deterministic path 16b from a replication node (e.g., "NI" 20) at time "t=0" at event 30 until reaching an identified elimination node (e.g., the egress node "NE" 20) at event 34. As illustrated in FIG. 2, the controller device 12 can determine that the average difference of latency (ADoL) 36 is the difference between the average latency 28a and the average latency 28b. As described in further detail below, the controller device 12 can determine the average latency 28a and average latency 28b based on traffic engineering metrics received from each of the network devices 20 (e.g., according to MPLS-TE, IGP-TE, etc.).

However, even though the controller device 12 can determine the average difference of latency (ADoL) 36 between the two deterministic paths 16a and 16b, random variations, fluctuations, etc. in data traffic throughout the deterministic data network 10 can cause different data packets along a given deterministic path 16 to be received at different times either before or after the corresponding average latency 28, where a given data packet transmitted along the deterministic path 16a can be received by the elimination node as early as event 38 or as late as event 40, also referred to herein as the path jitter (e.g., "2*J_L") 42a; similarly, a given data packet transmitted along the deterministic path 16b can be received by the elimination node as early as event 44 or as late as event 46, also referred to herein as the path jitter (e.g., "2*J_R") 42b.

Hence, even if the controller device 12 causes correction in operation 48 of the average difference of latency (ADoL) 36 between the deterministic paths 16a and 16b, the elimination node still will encounter the path jitter 42a of data packets received along the deterministic path 16a and the corresponding path jitter 42b of data packets received along the deterministic path 16b, resulting in a jitter difference ("JDoL") 50 that is the sum of the jitter deviation "J_L" in the first deterministic path 16a and the jitter deviation "J_R" in the second deterministic path 16b ("JDoL=J_L+J_R"); in other words, the jitter difference (JDoL) 50 is equal to the time value at event 46 minus the time value at event 38 minus the average difference of latency (ADoL) 36.

According to example embodiments, the controller device 12 can determine the average difference of latency (ADoL) 36, as well as the jitter difference (JDoL) 50 that identifies the maximum jitter encountered in the average difference of latency (ADoL) 36 between the deterministic paths 16a and deterministic path 16b. The controller device 12 can determine whether an identified elimination node (e.g., the egress node "NE" 20) is capable of absorbing the jitter difference (JDoL) 50, based on identifying whether the identified elimination node has sufficient buffer memory available for absorbing the jitter difference (JDoL) 50. The controller device 12 also can cause the elimination node, or an upstream node along one of the deterministic path 16a or deterministic path 16b to absorb the jitter difference (JDoL) 50, ensuring that the elimination node has sufficient memory for executing the elimination operation to guarantee the transmission of the identified flow of data packets 18 in the identified sequence to the destination host device 24.

As described below, the identification of the jitter difference (JDoL) 50, in combination identifying a network device 20 having sufficient buffer memory to absorb the jitter difference (JDoL) 50, enables the controller device 12 to cause the elimination node (or an upstream node along the faster relative deterministic path 16) to absorb the jitter difference, while enabling the controller device 12 to avoid an NP-complete problem of attempting to identify optimal deterministic paths for each identified flow of data packets in the deterministic data network 10.

Although only the deterministic data link between network devices "N1" and "N2" is labeled with the reference numeral "26" to avoid cluttering in FIG. 1, it should be apparent that all the data links (represented by arrows between the network devices 20, 22, and/or 24) are allocated the reference numeral "26" for purposes of the description herein. Further, although only the source host device 22 and the network device "NE" 20 are illustrated in FIG. 1 as outputting the identified flow of data packets 18 to avoid cluttering in the Figures, it should be apparent that the replication device (e.g. "NI") 20 outputs the identified flow of data packets 18 into each of the deterministic paths 16a and 16b, and that each of the network devices "N1" through "N8" 20 attempts to forward any received packets (received from its upstream neighbor via a corresponding deterministic data link 26 in the associated deterministic path 16) to its downstream neighbor via a corresponding deterministic data link 26 toward the egress node "NE" 20.

Figure 3:
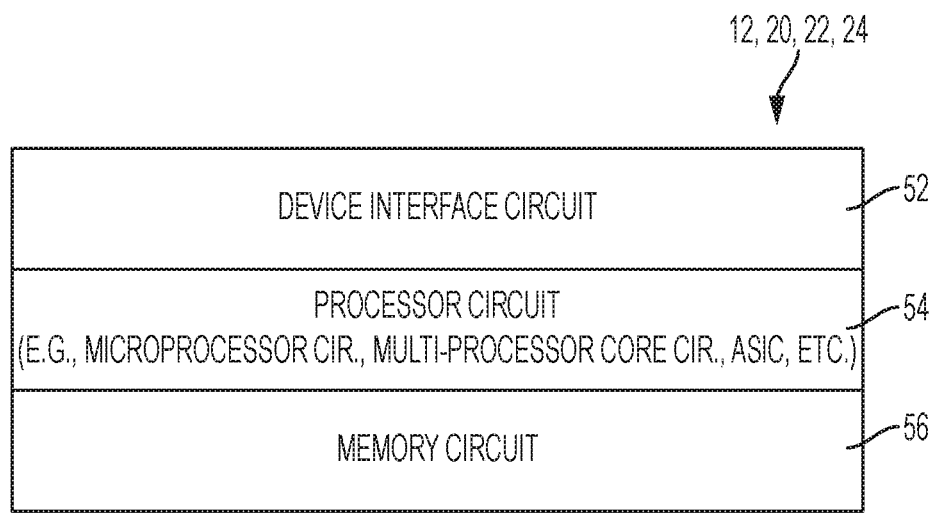
FIG. 3 illustrates any one of the controller device and/or the network devices of FIG. 1, according to an example embodiment.

FIG. 3 illustrates any one of the controller device 12 and/or the network devices 20, 22, and/or 24 of FIG. 1, according to an example embodiment. Each apparatus 12, 20 is a physical machine (i.e., a hardware device) configured for implementing network communications with other physical machines in the network 10. The term "configured for" or "configured to" as used herein with respect to a specified operation refers to a device and/or machine that is physically constructed and arranged to perform the specified operation.

Each apparatus 12, 20, 22, and/or 24 can include a device interface circuit 52, a processor circuit 54, and a memory circuit 56. The device interface circuit 52 can include one or more distinct physical layer transceivers for communication with any one of the other devices 12, 20, 22, and/or 24; the device interface circuit 52 also can include an IEEE based Ethernet transceiver for communications with the devices of FIG. 1 via any type of data link (e.g., a wired or wireless link, an optical link, etc.). The processor circuit 54 can be configured for executing any of the operations described herein, and the memory circuit 56 can be configured for storing any data or data packets as described herein.

Any of the disclosed circuits of the devices 12, 20, 22, and/or 24 (including the device interface circuit 52, the processor circuit 54, the memory circuit 56, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 56) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 56 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 56 can be implemented dynamically by the processor circuit 54, for example based on memory address assignment and partitioning executed by the processor circuit 54.

Figure 4A:
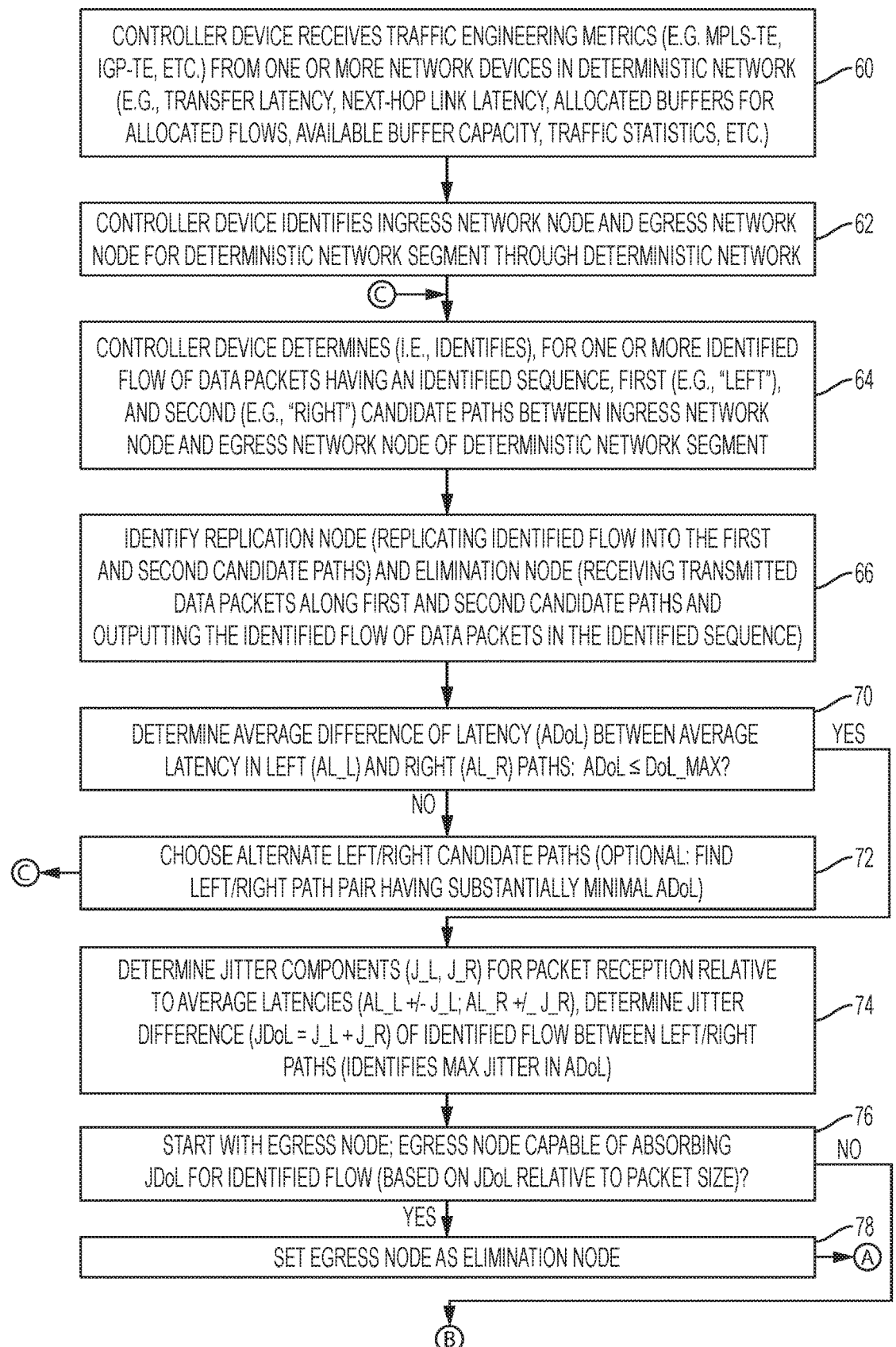
FIGS. 4A and 4B illustrate an example method of the controller device identifying the first and second paths of the deterministic network segment, determining a jitter difference between the first and second paths, and causing absorption of the jitter difference along at least one or more of the first or second paths, according to an example embodiment.
Figure 4B:
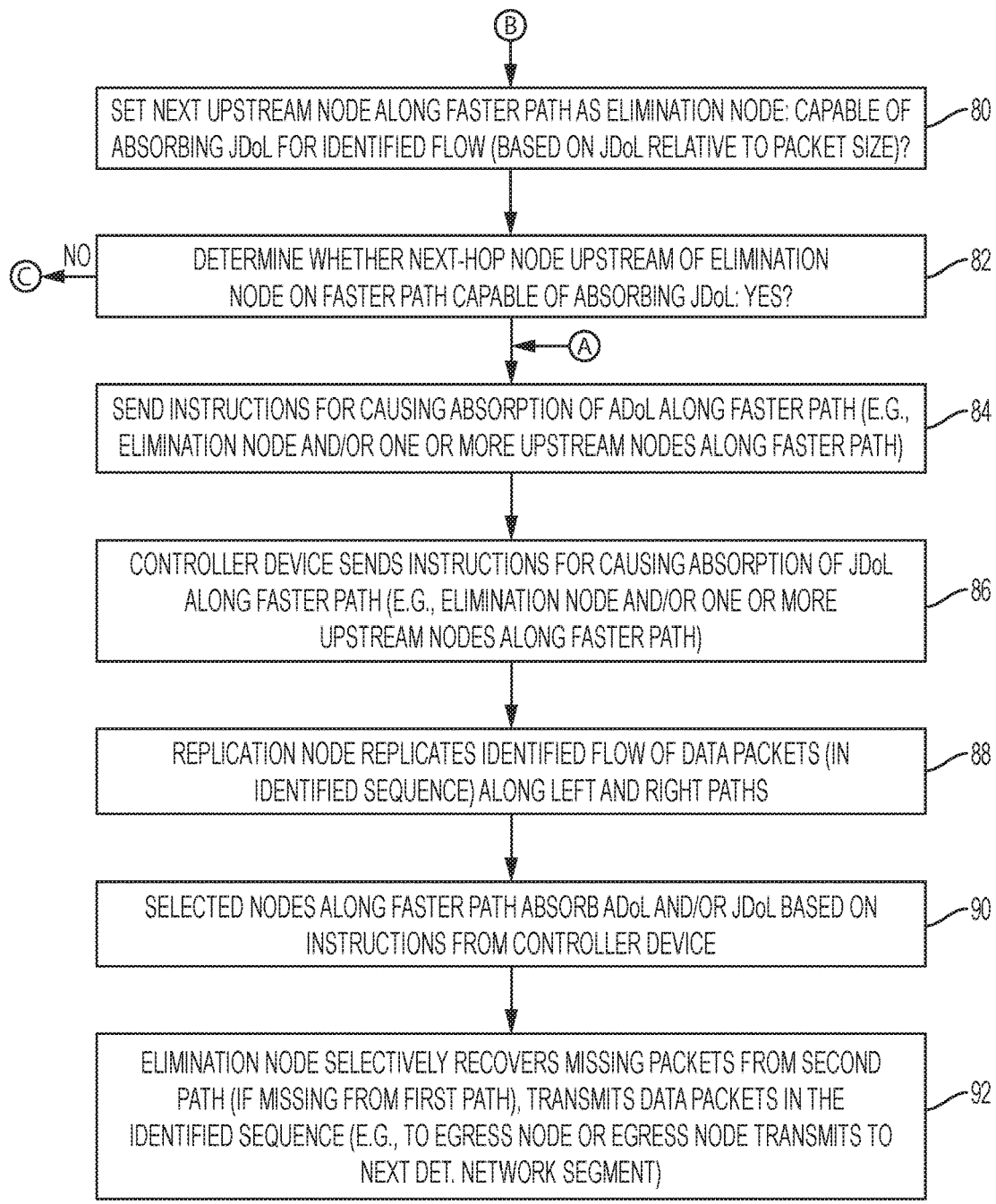

FIGS. 4A and 4B illustrate an example method of the controller device 12 identifying the first and second paths 16a, 16b of the deterministic network segment 14, determining a jitter difference 50 between the first and second paths 16a, 16b, and causing absorption of the jitter difference along at least one or more of the first or second paths, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the processor circuit 54 of the controller device 12 in operation 60 is configured for receiving traffic engineering metrics for each of the network devices 20 (e.g., via one or more of the network devices 20) in the deterministic data network 10. The traffic engineering metrics can be received in various forms, for example Multiprotocol Label Switching Traffic Engineering (MPLS-TE), Interior Gateway Protocol Traffic Engineering (IGP-TE) (e.g., according to the IETF Internet Draft by Geng et al., "IGP-TE Extensions for DetNet Information Distribution" (draft-geng-detnet-info-distribution-01), etc. The traffic engineering metrics can specify, for each network device 20, associated traffic engineering parameters such as transfer latency for a received data packet to be output by a network device 20, comprising for example retrieval latency from a receive buffer circuit (in the corresponding memory circuit 56) and transmit queuing latency (in the corresponding device interface circuit 52); the traffic engineering metrics also can specify next-hop latency, allocated buffer space (e.g., in the corresponding device interface circuit 52 and/or memory circuit 56) for allocated flows, available buffer space (e.g., in the corresponding device interface circuit 52 and/or memory circuit 56) for any future (unallocated) flows, traffic statistics (e.g., traffic loads, percent link utilization, congestion parameters, packet loss rate, etc.).

The processor circuit 54 of the controller device 12 can be configured to respond to the receive traffic engineering metrics by identifying in operation 62 an ingress network node (e.g., "NI" 20) and an egress network node (e.g., "NE" 20) for establishment of a deterministic segment 14 for the identified flow of data packets 18 through the deterministic data network 10, for example based on identifying the relative network locations of the source host device 22 and the destination host device 24 relative to the physical and overlying network-layer topology of the deterministic data network 10, identifying service level requirements (e.g., QoS requirements) relative to service level agreement (SLA) policies managed by the controller device 12 in the deterministic data network 10.

The processor circuit 54 of the controller device 12 in operation 64 can determine (i.e., identify) for one or more identified flows of data packets 18 having an identified sequence (e.g., P1, P2, P3, P4, . . . Pn), a "left" deterministic candidate path 16a and a "right" deterministic candidate path 16b between the ingress network node "NI" 20 and the egress node "NE" 20 of the deterministic network segment 14. For example, the processor circuit 54 of the controller device 12 in operation 64 can start with a shortest path first (SPF) computation to identify (as candidate paths) the two shortest non-overlapping (i.e., non-congruent) paths that do not contain any shared data link 26 between the two deterministic paths 16; the processor circuit 54 of the controller device 12 also can identify the respective average latencies 28 for the two shortest paths, as well as the respective average latencies 28 for longer paths that could serve as candidate paths; hence the processor circuit 54 of the controller device 12 can generate in operation 64 an ordered list of non-congruent deterministic paths 16, ordered by increasing average latency 28.

The processor circuit 54 of the controller device 12 can be configured for identifying in operation 66 a replication node that can replicate the identified flow of data packets 18 as a "left" copy of the identified flow of data packets 18 into the left deterministic path 16a and a "right" copy of the identified flow of data packets 18 into the right deterministic path 16b. The processor circuit 54 of the controller device 12 also can be configured for identifying in operation 66 an elimination node configured for receiving the "left" copy of the identified flow of data packets 18 having been transmitted via the left deterministic path 16a, receiving the "right" copy of the identified flow of data packets 18 having been transmitted via the right deterministic path 16b, recovering any lost packets between the left and right flows 18, and outputting the recovered identified flow of data packets 18 toward the destination host device 24. In one embodiment, the processor circuit 54 of the controller device 12 can initially identify in operation 66 the egress node "NE" 20 as an initial candidate elimination node, illustrated in FIG. 1 by the dashed lines indicating initial path links 68 that initially establish the left deterministic path 16a along the hop-by-hop sequence of network devices "N1", "N2", "N3", "N4".

The processor circuit 54 of the controller device 12 in operation 70 determines the average difference of latency (ADoL) 36 (illustrated in FIG. 2) based on the traffic engineering metrics (received in operation 60) for the network devices 20 associated with the left and right deterministic paths 16a and 16b, and the ordered list generated in operation 64. In particular, the processor circuit 54 of the controller device 12 in operation 70 can determine (e.g., from the ordered list) a candidate "left" latency ("AL_L") 28a for a candidate left deterministic path 16a, and a candidate "right" latency ("AL_R") 28b for a candidate right deterministic path 16b, and determine in operation 70 whether the average difference of latency (ADoL) 36 between the candidate "left" latency ("AL_L") 28a and the candidate "right" latency ("AL_R") 28b is less than an acceptable maximum difference of latency ("DoL_MAX") set by the controller device 12 based on the SLA policies, QoS requirements for the identified flow of data packets 18, etc.

If in operation 70 the processor circuit 54 of the controller device 12 determines the average difference of latency (ADoL) 36 is greater than the acceptable maximum difference of latency ("DoL_MAX"), the processor circuit 54 of the controller device 12 in operation 72 can repeat operation 64, etc. to identify an alternate candidate deterministic path 16 and an alternate elimination node (the controller device 12 can optionally identify a left/right deterministic path pair that provides the minimal average difference of latency (ADoL) 36, although normally such a severe constraint is not necessary). As illustrated in FIG. 1, the processor circuit 54 of the controller device 12 can change the deterministic path 16 from the hop-by-hop sequence of network devices "N1", "N2", "N3", "N4" to the hop-by-hop sequence of network devices "N1", "N2", "N3", "N8" (terminated by the network device "N8" as the elimination node).

If in operation 70 the processor circuit 54 of the controller device 12 determines the average difference of latency (ADoL) 36 is within the acceptable maximum difference of latency ("DoL_MAX"), the processor circuit 54 of the controller device 12 in operation 74 can determine the jitter components "J_L", "J_R" that quantify the path jitter 42a, 42b in the respective left and right deterministic paths 16a, 16b. The processor circuit 54 of the controller device 12 in operation 74 can determine the jitter difference (JDoL) 50 based on summing the jitter components "J_L" and "J_R", i.e., "JDoL=J_L+J_R", where the symbol "+" represents an addition operation. Hence, the jitter difference (JDoL) 50 identifies the maximum jitter that would be encountered by the elimination node relative to the average difference of latency (ADoL) 36, i.e., the maximum jitter encountered even after compensation of the average difference of latency (ADoL) 36 in operation 48 of FIG. 2.

Assuming the egress node "NE" 20 is still selected as the candidate elimination node, the processor circuit 54 of the controller device 12 is configured for determining in operation 76 whether the available buffer capacity of the candidate elimination node (e.g., the egress node "NE" 20) as identified in operation 60 is capable of absorbing the jitter difference (JDoL) 50 for the identified flow of data packets 18, for example based on the duration of the jitter difference (JDoL) 50 relative to typical packet size. If the processor circuit 54 of the controller device 12 determines the egress node "NE" 20 (as the elimination node for left deterministic path 16*a* comprising the initial path links 68, and the right deterministic path 16*b*) is capable of absorbing the jitter difference (JDoL) 50, the processor circuit 54 of the controller device 12 in operation 78 can set the egress node "NE" 20 as the elimination node, and continue with operation 84 of FIG. 4B (described below).

If in operation 76 the processor circuit 54 of the controller device 12 determines the egress node "NE" 12 (as the elimination node) is unable to absorb the jitter difference (JDoL) 50 for the identified flow of data packets 18, then referring to FIG. 4B the processor circuit 54 of the controller device 12 is configured for setting in operation 80 the next upstream node along the faster path as the elimination node. For example, referring to FIG. 1, assume the average latency "AL_L1" of the initial left deterministic path 16*a* comprising the hop-by-hop sequence of network devices "N1", "N2", "N3", "N4" (comprising the initial path links 68) is longer than the average latency 28*b* of the right deterministic path 16*b* comprising the hop-by-hop sequence of network devices "N5", "N6", "N7", and "N8" (i.e., "AL_L1>AL_R"); in this case, the processor circuit 54 of the controller device 12 can set the next upstream node "N8" as the elimination node based on changing the initial left deterministic path 16*a* to the hop-by-hop sequence of network devices "N1", "N2", "N3", "N8" as shown in FIG. 1 by the solid arrow from the network device "N3" 20 to the newly-allocated elimination node "N8" 20.

Alternately, the processor circuit 54 of the controller device 12 can bypass entirely the selection of the egress node "NE" 20 as the elimination node for the identified flow of data packets 18 based on a policy set in the controller device 12 (either globally or for identified flows of data packets), such that the controller device 12 can avoid selecting the egress node as an elimination node for a dual-path deterministic segment.

The processor circuit 54 of the controller device 12 in operation 80 can repeat operations 70 and 74 to identify the average difference of latency (ADoL) 36 and the jitter difference (JDoL) 50 for the updated left deterministic path 16*a* (comprising the hop-by-hop sequence of network devices "N1", "N2", "N3", "N8") relative to the right deterministic path 16*b* to identify the updated average latency 28*a*, average difference of latency (ADoL) 36, path jitter 42*a*, and jitter difference (JDoL) 50; hence, the processor circuit 54 of the controller device 12 in operation 80 can determine whether the new elimination node "N8" 20 is able to absorb the jitter difference (JDoL) 50 for the identified flow of data packets 18 relative to the packet size. The processor circuit 54 of the controller device 12 in operation 82 also can determine whether the next-hop node (e.g., "N3") upstream of the elimination node "N8" is able to absorb the jitter difference (JDoL) 50: if neither the elimination node "N8" nor the next-hop upstream node "N3" along the faster left deterministic path 16 are able to absorb the jitter difference (JDoL) 50 (singly or in combination, where jitter absorption can be shared between the elimination node "N8" and the next-hop upstream node "N3"), the processor circuit 54 of the controller device 12 returns to operation 64 to identify another candidate pair of left/right deterministic paths 16.

If in operation 80 and/or 82 the processor circuit 54 of the controller device 12 determines that any one of the elimination node "N8" and/or the next-hop upstream node "N3" can absorb the jitter difference (JDoL) 50 (singly or in combination by sharing portions of the jitter difference (JDoL) 50), the processor circuit 54 of the controller device 12 in operation 84 can send instructions to at least one of the elimination node "N8" or one or more upstream nodes (e.g., "N3", "N2") along the faster left deterministic path 16*a* to absorb the average difference of latency (ADoL) 36.

The processor circuit 54 of the controller device 12 in operation 86 also can send instructions for causing absorption of the jitter difference (JDoL) 50 by at least one of the elimination node "N8", or the upstream node "N3" along the faster left deterministic path 16*a*.

Hence, the instructions sent by the device interface circuit 52 of the controller device 12 in operation 86 enables at least one of the elimination node "N8", or the upstream node "N3", to absorb the jitter difference (JDoL) 50 that might be encountered by the elimination node "N8" upon reception of the left copy of the identified flow of data packets 18 and the right copy of the identified flow of data packets 18.

As described previously, the controller device 12 can cause the replication node (e.g., "NI" 20) to replicate in operation 88 the identified flow of data packets 18 as a "left" copy of the identified flow of data packets 18 into the left deterministic path 16*a* and a "right" copy of the identified flow of data packets 18 into the right deterministic path 16*b*. Selected nodes (e.g., "N2", "N3", "N8" along the faster left deterministic path 16*a* can absorb the average difference of latency (ADoL) 36 and/or the jitter difference (JDoL) 50, based on the instructions received from the controller device 12 (in operations 84 and 86). Hence, the elimination node "N8" in operation 92 can selectively recover any missing packets from the right deterministic path 16*b*, and transmit the recovered identified flow of data packets 18 in the identified sequence to the egress node "NE" for delivery to the destination host device 24. For example, assume the replication node "NI" 20 outputs on both deterministic paths 16*a*, 16*b* the identified flow of data packets 18 in the identified sequence (e.g., P1, P2, P3, P4, P5, . . . Pn): assume further the identified flow of data packets 18 encounters a loss of the packet "P2" on the deterministic path 16*a* and a loss of the packet "P3" on the deterministic path 16*b*; hence, the elimination node "N8" receives from the next-hop upstream node "N3" in the faster left deterministic path 16*a* the packet sequence "P1", "P3", "P4", "P5, etc., and the elimination node "N8" receives from the next-hop upstream node "N7" in the slower right deterministic path 16*b* the packet sequence "P1", "P2", "P4", "P5", etc. The elimination node "N8" can recover and output the identified flow of data packets 18 in the identified sequence (e.g., P1, P2, P3, P4, P5, . . . Pn) based on using the packet "P2" from the right deterministic path 16*b*, and the packet "P3" from the left deterministic path 16*a*, with minimal buffering requirements based on the jitter absorption implemented in the elimination node "N8" and/or the next-hop upstream node "N3" 20.

According to example embodiments, latency differences and jitter differences are compared to buffer capabilities of network devices along multiple paths of a deterministic segment to identify adequate absorption of the latency and jitter differences, relative to available buffer capabilities. The example embodiments can avoid NP-complete calculations in the deterministic scheduling by the controller device based on avoiding the necessity of calculating optimal paths providing minimal latency or minimal jitter. Further, the controller device can identify and select an elimination node that is one or two hops away from an egress node based on determining that the elimination node can deterministically supply the identified flow of data packets within acceptable constraints for jitter and latency.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   identifying, by a controller device, first and second paths between an ingress network node and an egress network node in a deterministic network for an identified flow of data packets in an identified sequence, the identifying including identifying a replication node for replicating the identified flow into the first and second paths, and identifying an elimination node for receiving transmitted data packets along the first and second paths for the identified flow and transmitting the identified flow of data packets in the identified sequence;
   determining, by the controller device, a jitter difference of the identified flow between the first and second paths, the jitter difference being a maximum jitter minus an average difference of latency between the first and second paths, wherein the maximum jitter is between earliest and latest packet reception times along the first and second paths, and the average difference of latency is a corresponding difference between an average latency of the first path and the corresponding average latency of the second path; and
   causing, by the controller device, at least one of the elimination node or an upstream node along one of the first or second paths to absorb the jitter difference.

2. The method of claim 1, wherein the identifying includes:
   selectively identifying the egress node as the elimination node based on determining that the egress node is capable of absorbing the jitter difference for the identified flow of data packets, relative to other identified flows of data packets; or
   selectively identifying, as the elimination node, a network node that is one or more hops from the egress node based on determining the network node is capable of absorbing the jitter difference for the identified flow of data packets.

3. The method of claim 2, wherein the causing includes selectively causing the upstream node to absorb the jitter difference based on determining the elimination node is incapable of absorbing the jitter difference and the upstream node is capable of absorbing the jitter difference.

4. The method of claim 1, further comprising receiving buffer memory capacity information from each network device in the deterministic network, wherein:
   the identifying includes selecting the elimination node based on the corresponding buffer memory capacity information of the elimination node relative to the corresponding buffer memory capacity information of the egress node;
   the causing including identifying the at least one elimination node or upstream node to absorb the jitter difference, based on the respective buffer memory capacity information of the elimination node and the upstream node.

5. The method of claim 1, wherein:
   the identifying includes selecting the first and second paths based on determining the average difference of latency is substantially minimal relative to other available paths in the deterministic network;
   the causing includes identifying the at least one of the elimination node or the upstream node to have sufficient memory to absorb the jitter difference.

6. The method of claim 1, wherein the identifying includes identifying the first and second paths as belonging to a deterministic network segment, for the identified flow of data packets, between the ingress network node and the egress network node of the deterministic network.

7. The method of claim 1, wherein the causing includes:
   identifying the first path as a faster path providing a lower average latency and the second path as a slower path providing a higher average latency that is greater than the lower average latency by the average difference of latency; and
   causing at least one of the elimination node or an upstream node on the faster path to absorb the jitter difference and the average difference of latency.

8. An apparatus comprising:
   a memory circuit configured for storing executable instructions; and
   a processor circuit configured for executing the executable instructions, the processor circuit in response to execution of the executable instructions configured for:
   identifying first and second paths between an ingress network node and an egress network node in a deterministic network for an identified flow of data packets in an identified sequence, the identifying including identifying a replication node for replicating the identified flow into the first and second paths, and identifying an elimination node for receiving transmitted data packets along the first and second paths for the identified flow and transmitting the identified flow of data packets in the identified sequence,
   determining a jitter difference of the identified flow between the first and second paths, the jitter difference being a maximum jitter minus an average difference of latency between the first and second paths, wherein the maximum jitter is between earliest and latest packet reception times along the first and second paths, and the average difference of latency is a corresponding difference between an average latency of the first path and the corresponding average latency of the second path; and
   causing at least one of the elimination node or an upstream node along one of the first or second paths to absorb the jitter difference.

9. The apparatus of claim 8, wherein the identifying includes:
   selectively identifying the egress node as the elimination node based on determining that the egress node is capable of absorbing the jitter difference for the identified flow of data packets, relative to other identified flows of data packets; or
   selectively identifying, as the elimination node, a network node that is one or more hops from the egress node based on determining the network node is capable of absorbing the jitter difference for the identified flow of data packets.

10. The apparatus of claim 9, wherein the causing includes selectively causing the upstream node to absorb the jitter difference based on determining the elimination node is incapable of absorbing the jitter difference and the upstream node is capable of absorbing the jitter difference.

11. The apparatus of claim 8, wherein the processor circuit in response to execution of the executable instructions further is configured for receiving buffer memory capacity information from each network device in the deterministic network, wherein:
the identifying includes selecting the elimination node based on the corresponding buffer memory capacity information of the elimination node relative to the corresponding buffer memory capacity information of the egress node;
the causing including identifying the at least one elimination node or upstream node to absorb the jitter difference, based on the respective buffer memory capacity information of the elimination node and the upstream node.

12. The apparatus of claim 8, wherein:
the identifying includes selecting the first and second paths based on determining the average difference of latency is substantially minimal relative to other available paths in the deterministic network;
the causing includes identifying the at least one of the elimination node or the upstream node to have sufficient memory to absorb the jitter difference.

13. The apparatus of claim 8, wherein the identifying includes identifying the first and second paths as belonging to a deterministic network segment, for the identified flow of data packets, between the ingress network node and the egress network node of the deterministic network.

14. The apparatus of claim 8, wherein the causing includes:
identifying the first path as a faster path providing a lower average latency and the second path as a slower path providing a higher average latency that is greater than the lower average latency by the average difference of latency; and
causing at least one of the elimination node or an upstream node on the faster path to absorb the jitter difference and the average difference of latency.

15. One or more non-transitory tangible media encoded with logic for execution by a machine and when executed by the machine operable for:
identifying, by the machine implemented as a controller device, first and second paths between an ingress network node and an egress network node in a deterministic network for an identified flow of data packets in an identified sequence, the identifying including identifying a replication node for replicating the identified flow into the first and second paths, and identifying an elimination node for receiving transmitted data packets along the first and second paths for the identified flow and transmitting the identified flow of data packets in the identified sequence;

determining, by the controller device, a jitter difference of the identified flow between the first and second paths, the jitter difference being a maximum jitter minus an average difference of latency between the first and second paths, wherein the maximum jitter is between earliest and latest packet reception times along the first and second paths, and the average difference of latency is a corresponding difference between an average latency of the first path and the corresponding average latency of the second path; and
causing, by the controller device, at least one of the elimination node or an upstream node along one of the first or second paths to absorb the jitter difference.

16. The one or more non-transitory tangible media of claim 15, wherein the causing includes selectively causing the upstream node to absorb the jitter difference based on determining the elimination node is incapable of absorbing the jitter difference and the upstream node is capable of absorbing the jitter difference.

17. The one or more non-transitory tangible media of claim 15, further operable for receiving buffer memory capacity information from each network device in the deterministic network, wherein:
the identifying includes selecting the elimination node based on the corresponding buffer memory capacity information of the elimination node relative to the corresponding buffer memory capacity information of the egress node;
the causing including identifying the at least one elimination node or upstream node to absorb the jitter difference, based on the respective buffer memory capacity information of the elimination node and the upstream node.

18. The one or more non-transitory tangible media of claim 15, wherein:
the identifying includes selecting the first and second paths based on determining the average difference of latency is substantially minimal relative to other available paths in the deterministic network;
the causing includes identifying the at least one of the elimination node or the upstream node to have sufficient memory to absorb the jitter difference.

19. The one or more non-transitory tangible media of claim 15, wherein the identifying includes identifying the first and second paths as belonging to a deterministic network segment, for the identified flow of data packets, between the ingress network node and the egress network node of the deterministic network.

20. The one or more non-transitory tangible media of claim 15, wherein the causing includes:
identifying the first path as a faster path providing a lower average latency and the second path as a slower path providing a higher average latency that is greater than the lower average latency by the average difference of latency; and
causing at least one of the elimination node or an upstream node on the faster path to absorb the jitter difference and the average difference of latency.

* * * * *